US012293752B2

(12) United States Patent
Karp et al.

(10) Patent No.: US 12,293,752 B2
(45) Date of Patent: May 6, 2025

(54) GRADUAL NOISE CANCELING IN COMPUTER GAME

(71) Applicant: Sony Interactive Entertainment Inc., Tokyo (JP)

(72) Inventors: Sarah Karp, San Mateo, CA (US); Celeste Bean, San Mateo, CA (US); Tatianna Manzon-Gutzman, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 18 days.

(21) Appl. No.: 18/045,167

(22) Filed: Oct. 9, 2022

(65) Prior Publication Data

US 2024/0119921 A1 Apr. 11, 2024

(51) Int. Cl.
*G10K 11/178* (2006.01)

(52) U.S. Cl.
CPC .. *G10K 11/17837* (2018.01); *G10K 11/17823* (2018.01)

(58) Field of Classification Search
CPC ....... G10K 11/17837; G10K 11/17823; G10K 11/17821; G10K 11/1787; G10K 11/1783; G10K 2210/1081; G10K 2210/30231; G10K 2210/3056
USPC ........................................................ 381/71.1
See application file for complete search history.

(56) References Cited

U.S. PATENT DOCUMENTS

2022/0078543 A1* 3/2022 Kulavik ........... G10K 11/17857
2022/0159367 A1* 5/2022 Yamkovoy ....... G10K 11/17821

* cited by examiner

*Primary Examiner* — Paul Kim
(74) *Attorney, Agent, or Firm* — Kilpatrick Townsend & Stockton LLP

(57) ABSTRACT

To avoid startling a computer game player immersed in virtual reality for example, active noise cancelation is gradually introduced. As an alternative, ambient noise is gradually increased to conceal loud external sounds. The noise cancelation or ambient noise generation is established according to sound exceeding a background threshold as detected by a microphone. The noise cancelation or ambient noise generation can be established according to images of a noisy object as imaged by a camera.

20 Claims, 5 Drawing Sheets

GRADUAL NOISE CANCELING IN COMPUTER GAME

FIELD

The present application relates generally to gradual noise canceling in computer simulations such as computer games.

BACKGROUND

As understood herein, in computer simulations such as computer games, noise canceling may be implemented to reduce the interference of ambient noise on computer game players.

SUMMARY

As further understood herein, suddenly implementing noise canceling may startle a player particularly one wearing a virtual reality (VR) headset.

Accordingly, an apparatus includes at least one processor configured to detect a disturbance in the vicinity of a display of a computer simulation. The processor also is configured to, responsive to the disturbance, gradually increase noise canceling in at least one computer simulation headset, and/or gradually increase ambient noise in a region of the headset.

In some examples, the processor can be configured to detect the disturbance based on at least one camera image and/or based on at least one signal from at least one motion sensor and/or based on at least one signal from at least one microphone.

The disturbance can be an audible disturbance, and may be determined to be such based on the audible disturbance having an amplitude at least greater than a first amplitude. Further, in some embodiments the audible disturbance is determined to be an audible disturbance based on the audible disturbance having an amplitude at least greater than a first amplitude and a duration at least as long as a first duration.

In another aspect, a method is disclosed to avoid startling a computer game player immersed in virtual reality. The method includes detecting sound exceeding a background threshold, and responsive to detecting the sound, generating noise cancelation or ambient noise for at least one speaker in at least one computer simulation headset.

In another aspect, a device includes at least one computer storage that is not a transitory signal and that in turn includes instructions executable by at least one processor to detect a disturbance, and gradually increase ambient noise and/or noise canceling in the region of a computer simulation player wearing a headset.

In examples of this aspect, the instructions may be executable to establish a rate of increase of the ambient noise and/or noise cancelation based at least in part on an amplitude of the disturbance, and/or based on a duration of the disturbance.

The details of the present application, both as to its structure and operation, can be best understood in reference to the accompanying drawings, in which like reference numerals refer to like parts, and in which:

DETAILED DESCRIPTION

Figure 1:
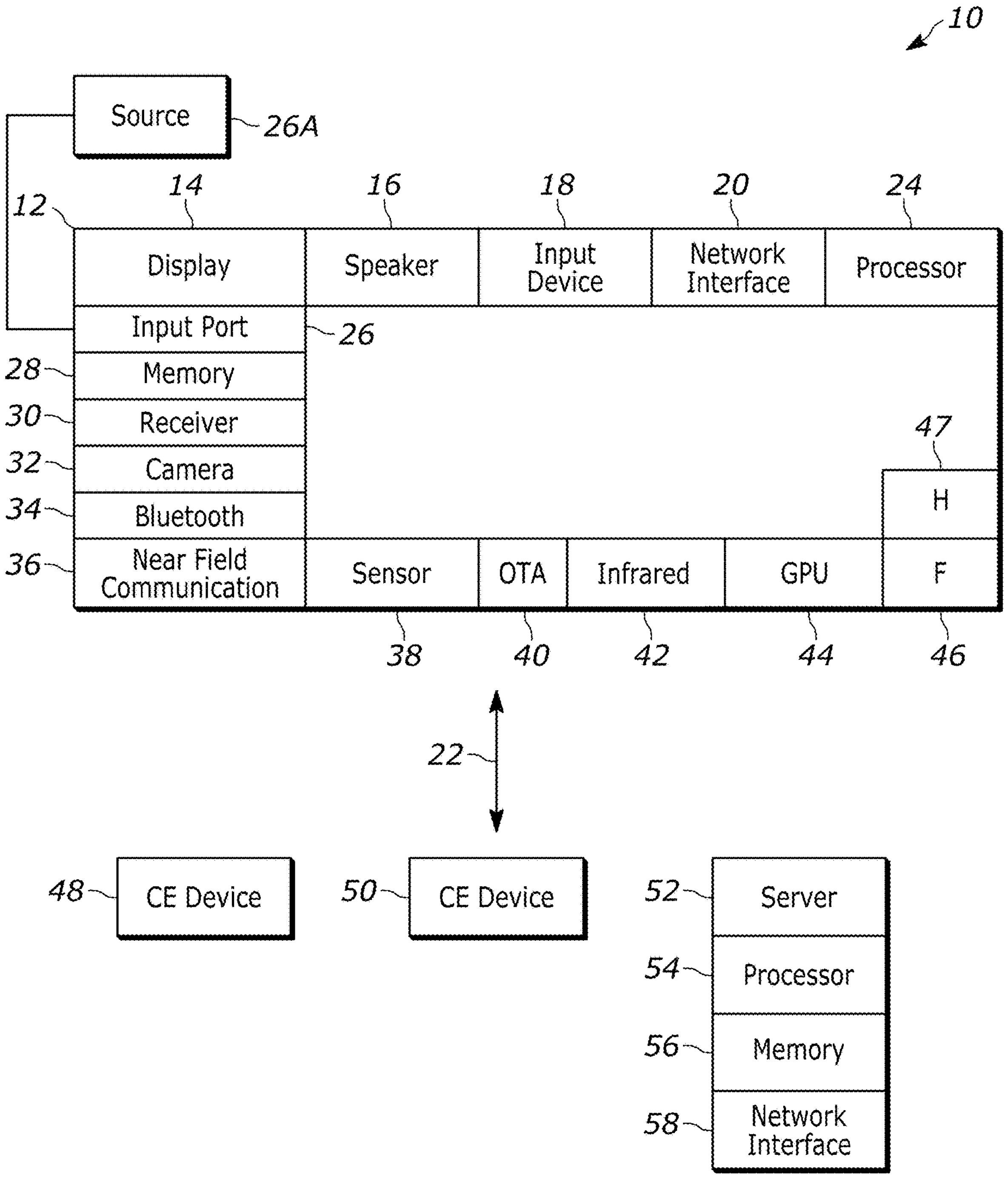
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chas sis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
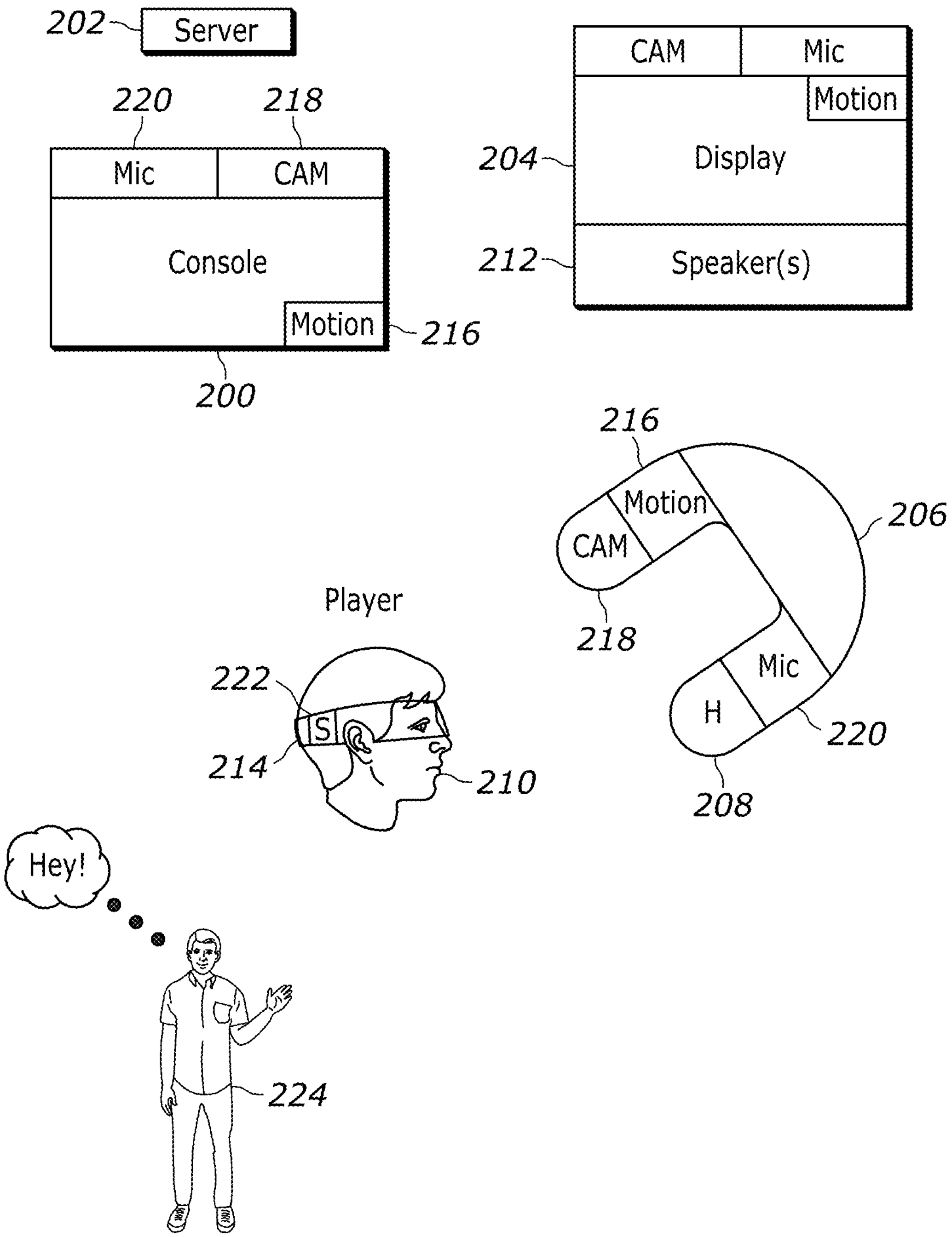
FIG. 2 illustrates an example specific system consistent with present principles.

Refer now to FIG. 2. A computer simulation such as a computer game may be sent from a computer game console 200 or a computer game server 202 to a display device 204 such as a TV for presentation of the computer simulation under control of one or more computer simulation controllers 206, such as but not limited to a PlayStation® controller or other controller.

One or more haptic generators 208 may be provided on the controller 206, which can be operated by a player 210 to control presentation of the computer simulation. Audio sourced from the game console 200 or server 202 is played on one or more speakers 212 of a speaker system. The player 210 may wear a virtual reality (VR) or augmented reality (AR) head-mounted display (HMD) such as a headset 214 such as a PlayStation® headset. Any one or more of the console 200, display 204, controller 206, and headset 214 may include one or more motion sensors 216, one or more cameras 218, and one or more microphones 220.

In addition to the speaker(s) 212 of the display 204, the headset 214 may include one or more speakers 222. The player 210 may be immersed in a VR or AR computer simulation being presented on the headset 214 with audio from the simulation being played on the headset speaker 222 when the player 210 may be interrupted by a real world disturbance such as a dog braking, a motor starting, or a person 224 shouting.

The elements of the system shown in FIG. 2 can incorporate some or all of the appropriate devices and components described above in reference to FIG. 1.

Figure 3:
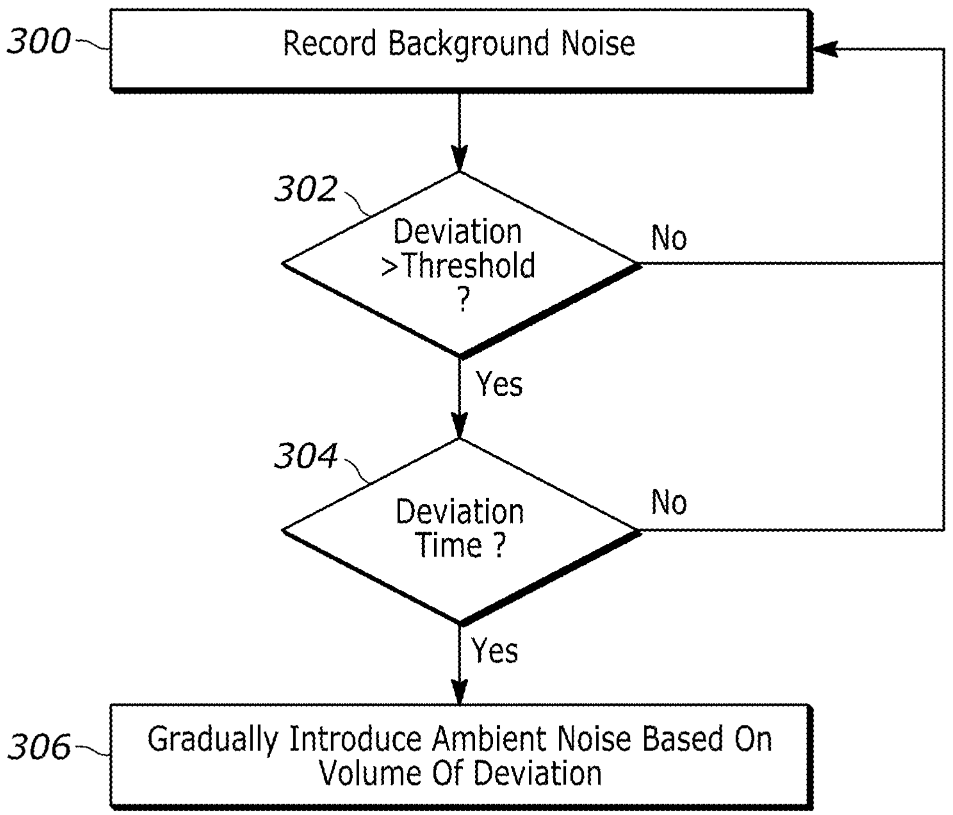
FIG. 3 illustrates example logic in example flow chart format.

FIG. 3 illustrates example logic in a first implementation. Commencing at block 300, background noise is recorded in the vicinity of the player shown in FIG. 2. The background noise may be detected by any one or more of the microphones shown in FIG. 2 and may be averaged over a time period such as ten minutes or thirty minutes or other period to establish the amplitude of a baseline background noise floor.

Decision diamond 302 indicates that during game play, should the amplitude of a deviation (also referred to herein as a disturbance) in background noise exceed a threshold above the floor established at block 300, if desired the logic may proceed to optional step 304 to determine whether the noise detected at decision diamond 302 lasts for at least a certain duration, e.g., more than one-half second, to avoid invoking active noise canceling ANC) or ambient noise addition based on spurious spikes.

From optional step 304 if the deviation lasts at least the duration or from decision diamond 302 when the deviation exceeds the threshold and step 304 is omitted, the logic moves to block 306. At block 306 ambient noise in the vicinity of the player may be gradually introduced at a rate and amplitude that may depend on the amplitude of the deviation detected at decision diamond 302, to avoid startling the player with a sudden increase in emulated ambient noise.

The ambient noise may be emulated to be gradually increased by, e.g., playing, on the headset speakers, white noise at a gradually increasing amplitude. The amplitude may gradually increase along a continuous amplitude curve that may be linear, the slope of which may depend on the amplitude of the deviation. Once the deviation ceases, emulated amplitude noise also ceases.

Figure 4:
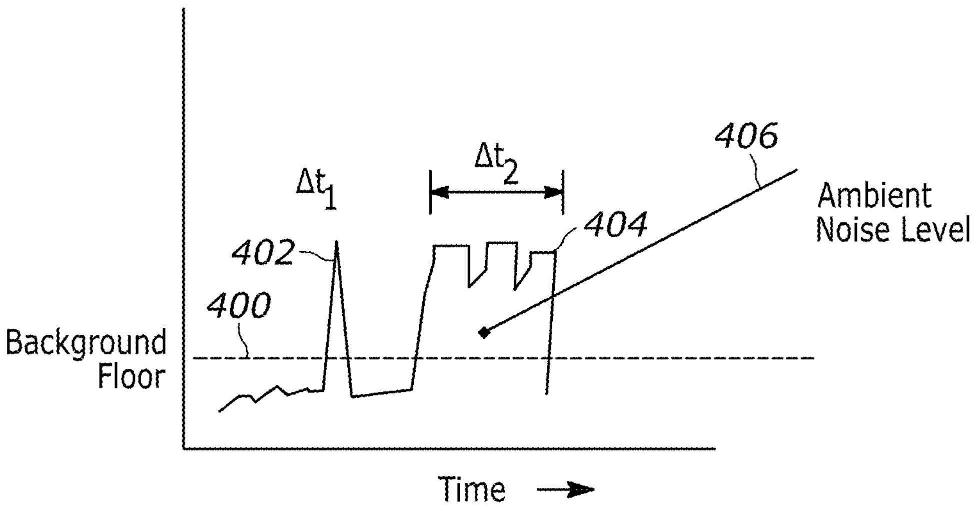
FIG. 4 illustrates an example signal waveform.

FIG. 4 illustrates further. A background noise floor is illustrated as a horizontal line 400 over time. A first deviation 402 has an amplitude significantly exceeding the floor 400, but a short time duration $\Delta t_1$ and so no emulated ambient noise is generated when optional step 304 in FIG. 3 is used.

On the other hand, a second deviation 404 has an amplitude significantly exceeding the floor 400 along with a time duration $\Delta t_2$ that is greater than the period discussed in FIG. 3 above and so emulated ambient noise 406 is generated with a gradually increasing volume, in the example shown, a linearly increasing volume although it is to be understood that the emulated noise may increase by temporally equally-spaced decibel levels. While FIG. 4 illustrates for ease of perception that the emulated ambient noise 406 continues to increase after the second deviation 404 ends, it is to be understood that the emulated ambient noise may end when the deviation ends.

Figure 5:
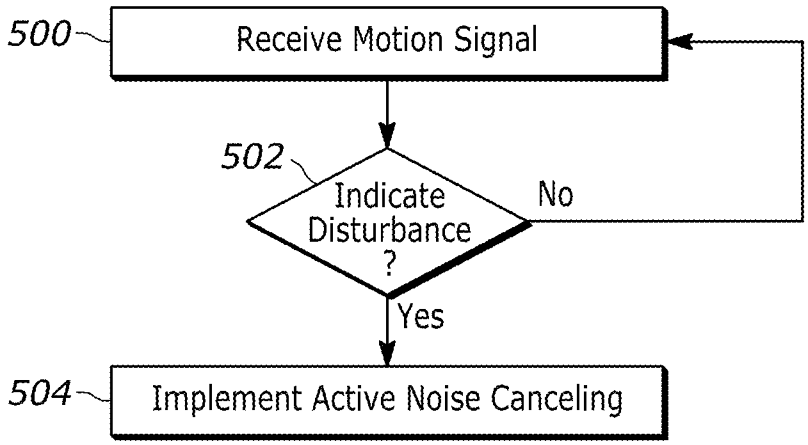
FIG. 5 illustrates first example specific logic in example flow chart format.
Figure 6:
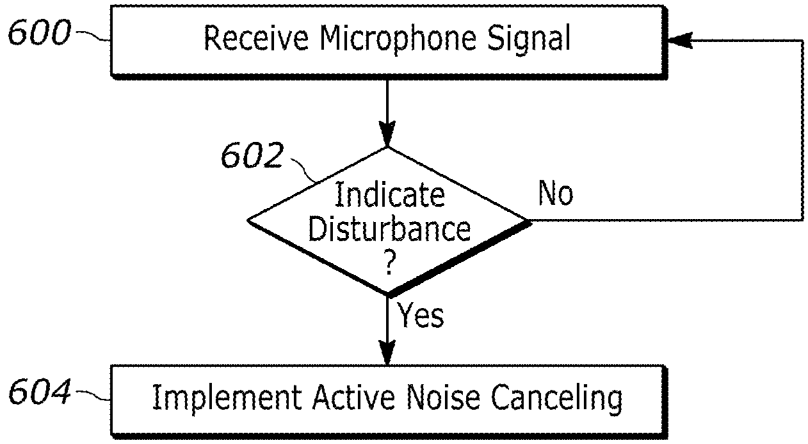
FIG. 6 illustrates second example specific logic in example flow chart format.
Figure 7:
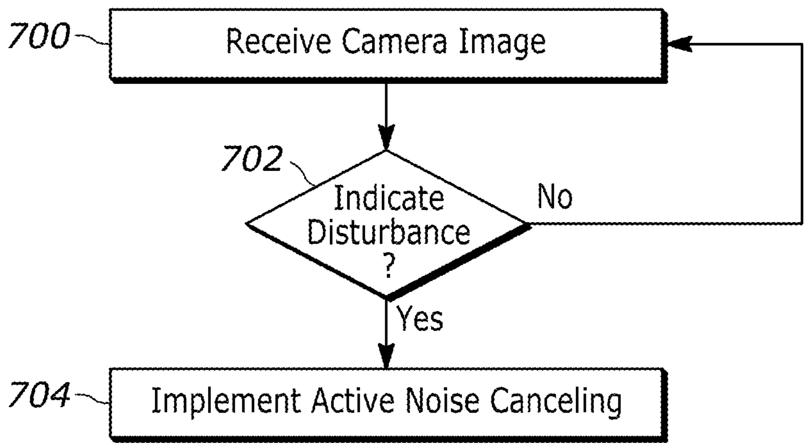
FIG. 7 illustrates third example specific logic in example flow chart format.

FIGS. 5-7 illustrate alternative techniques. Commencing at block 500 in FIG. 5, a motion signal is received from any one or more of the motion sensors shown in FIG. 2, potentially indicating a possible disturbance. If the motion signals indicate a possible disturbance at decision diamond 502, active noise canceling (ANC) may be implemented at a gradually increasing rate at block 504.

The determination at decision diamond 502 may be made using rules, e.g., if speed of motion exceeds a threshold, it indicates a disturbance, or by a machine learning (ML) model trained on a training set of motion signals with ground truth labels indicating whether the signals are or are not to be regarded as disturbances.

Turning to block 600 in FIG. 6, a microphone signal is received from any one or more of the microphones shown in FIG. 2, potentially indicating a possible disturbance. If the microphone signals indicate a possible disturbance at decision diamond 602, ANC may be implemented at a gradually increasing rate at block 604.

The determination at decision diamond 602 may be made using rules, e.g., if volume of microphone signal exceeds a threshold, it indicates a disturbance. Or, a ML model may make the determination. Such a ML model may be trained on a training set of microphone signals with ground truth labels indicating whether the signals are or are not to be regarded as disturbances.

Now consider block 700 in FIG. 7, in which one or more mages from any one or more of the cameras shown in FIG. 2 is received, potentially indicating a possible disturbance. If the image(s) indicate a possible disturbance at decision diamond 702, ANC may be implemented at a gradually increasing rate at block 704.

The determination at decision diamond 702 may be made using rules, e.g., if a shouting person or barking dog is imaged it indicates a disturbance. Or, a ML model may make the determination. Such a ML model may be trained on a training set of images with ground truth labels indicating whether the images are or are not to be regarded as disturbances.

The techniques described above for FIGS. 3 and 5-7 may be combined if desired.

Figure 8:
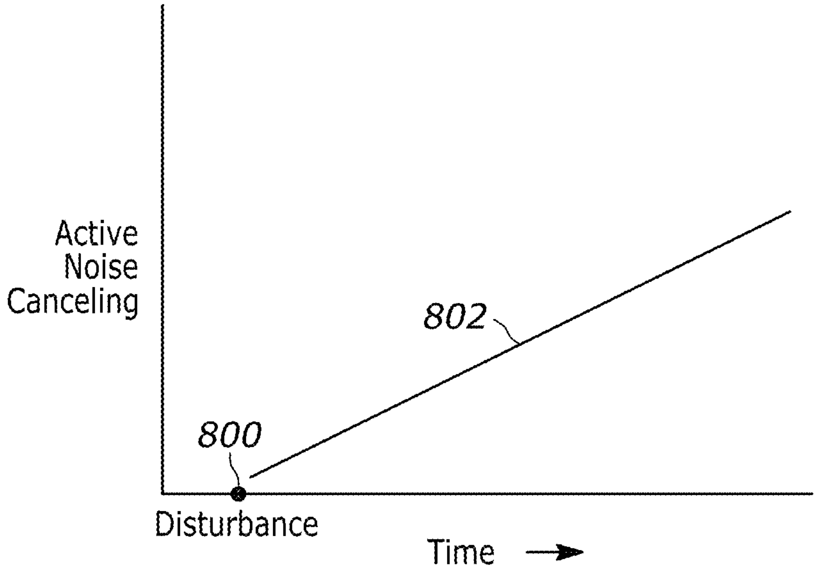
FIG. 8 illustrates an example ANC waveform.

FIG. 8 illustrates the techniques of FIGS. 5-7. When a disturbance 800 is determined to have occurred, ANC 802 is implemented at first at a low level, increasingly linearly to higher levels as shown.

While the particular embodiments are herein shown and described in detail, it is to be understood that the subject matter which is encompassed by the present invention is limited only by the claims.

What is claimed is:

1. An apparatus comprising:

at least one processor system comprising at least one processor, the processor system being configured to:

detect a disturbance in the vicinity of a display of a computer simulation; and responsive to the disturbance, gradually increase ambient noise in a region of the headset, wherein increasing ambient noise comprises increasing white noise.

2. The apparatus of claim 1, wherein the processor system is configured to:

responsive to the disturbance, gradually increase noise canceling in the at least one computer simulation headset.

3. The apparatus of claim 1, wherein the processor system is configured to:

detect the disturbance based on at least one signal from at least one microphone.

4. The apparatus of claim 1, wherein the disturbance comprises an audible disturbance.

5. The apparatus of claim 4, wherein the audible disturbance is determined to be an audible disturbance based on the audible disturbance having an amplitude at least greater than a first amplitude.

6. The apparatus of claim 4, wherein the audible disturbance is determined to be an audible disturbance based on the audible disturbance having an amplitude at least greater than a first amplitude and a duration at least as long as a first duration.

7. The apparatus of claim 1, wherein the processor is configured to:

responsive to the disturbance, gradually increase noise canceling in at least one computer simulation headset, and/or gradually increase ambient noise in a region of the headset at least in part by:

implementing the noise canceling at a gradually increasing rate.

8. A method to avoid startling a computer game player immersed in virtual reality, comprising:

detecting sound exceeding a background threshold; and responsive to detecting the sound, generating noise cancelation or ambient noise for at least one speaker in at least one computer simulation headset, wherein generating noise cancelation or ambient noise comprises gradually introducing ambient noise at a rate and/or amplitude that depends on an amplitude of the disturbance, and/or wherein generating noise cancelation or ambient noise comprises gradually increasing ambient noise along a continuous amplitude curve.

9. The method of claim 8, comprising:

responsive to detecting the sound, generating noise cancelation for the at least one speaker in the at least one computer simulation headset.

10. The method of claim 8, comprising:

responsive to detecting the sound, generating or ambient noise for the at least one speaker in the at least one computer simulation headset.

11. The method of claim 8, comprising determining the sound is an audible disturbance based on the sound having an amplitude at least greater than a first amplitude.

12. The method of claim 8, comprising determining the sound is an audible disturbance based on the sound having an amplitude at least greater than a first amplitude and a duration at least as long as a first duration.

13. The method of claim 8, wherein generating noise cancelation or ambient noise comprises gradually introducing ambient noise at a rate and/or amplitude that depends on an amplitude of the disturbance.

14. The method of claim 8, wherein generating noise cancelation or ambient noise comprises gradually increasing ambient noise along a continuous amplitude curve.

15. A device comprising:

at least one computer storage that is not a transitory signal and that comprises instructions executable by at least one processor to:

detect a disturbance; and gradually increase ambient noise and/or noise canceling in the region of a computer simulation player wearing a headset, a rate of increase of the ambient noise and/or noise cancelation being based at least in part on a duration of the disturbance.

16. The device of claim 15, wherein the instructions are executable to:

gradually increase ambient noise in the region of the computer simulation player wearing the headset.

17. The device of claim 15, wherein the instructions are executable to:

gradually increase noise cancelation in the region of the computer simulation player wearing the headset.

18. The device of claim 15, wherein the instructions are executable to:

establish a rate of increase of the ambient noise and/or noise cancelation based at least in part on an amplitude of the disturbance.

19. An apparatus comprising:

at least one processor system comprising at least one processor, the processor system being configured to:

detect a disturbance in the vicinity of a display of a computer simulation; and responsive to the disturbance, gradually increase noise canceling in at least one computer simulation headset, and/or gradually increase ambient noise in a region of the headset at least in part by:

gradually introducing ambient noise at a rate and/or amplitude that depends on an amplitude of the disturbance.

20. An apparatus comprising:

at least one processor system comprising at least one processor, the processor system being configured to:

detect a disturbance in the vicinity of a display of a computer simulation; and responsive to the disturbance, gradually increase noise canceling in at least one computer simulation headset, and/or gradually increase ambient noise in a region of the headset at least in part by:

gradually increasing ambient noise along a continuous amplitude curve.

* * * * *